United States Patent [19]

Gregor et al.

[11] Patent Number: 4,555,408

[45] Date of Patent: Nov. 26, 1985

[54] SAUSAGE

[75] Inventors: Barbara Gregor, Moorrege; Gebhard Huckfeldt, Tornesch, both of Fed. Rep. of Germany

[73] Assignee: Huckfeldt & Thorlichen, Tornesch, Fed. Rep. of Germany

[21] Appl. No.: 648,671

[22] Filed: Sep. 10, 1984

[30] Foreign Application Priority Data

Oct. 15, 1983 [DE] Fed. Rep. of Germany ....... 3333387

[51] Int. Cl.$^4$ ............................................... A23L 1/31
[52] U.S. Cl. .................................... 426/90; 138/118.1; 426/105; 426/135
[58] Field of Search ................. 426/90, 105, 129, 135, 426/140; 138/118.1, 124; 428/36

[56] References Cited

U.S. PATENT DOCUMENTS 4,006,756  2/1977  Gerigk et al. ..................... 138/118.1
4,163,463  8/1979  O'Brien ........................... 426/105 X
4,248,900  2/1981  Hammer et al. .................... 426/105

FOREIGN PATENT DOCUMENTS 913033   6/1954  Fed. Rep. of Germany ...... 426/105
2803361  8/1979  Fed. Rep. of Germany ... 138/118.1
7003190  9/1971  Netherlands .................... 138/118.1

Primary Examiner—Arthur L. Corbin
Attorney, Agent, or Firm—Prutzman, Kalb, Chilton & Alix

[57] ABSTRACT

An artificial sausage casing of two-dimensional fiber material, in particular a knitted or woven fabric, is impregnated, at least on the inside, with fat in order to extend the maturing time of the sausage. To obtain good adhesion to the surface of encased sausage meat the inside of the casing surface is provided with a pile consisting of stiff fibers and/or filaments which are positively anchored in the surface of the sausage meat.

8 Claims, 1 Drawing Figure

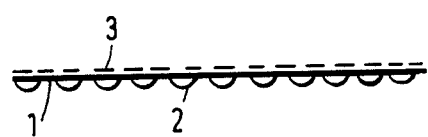

SAUSAGE

FIELD OF THE INVENTION

The invention relates to an artificial sausage casing of two-dimensional fiber material, which is rough on the inside, and, if appropriate, with an impregnation of collagen. The invention also relates to a sausage prepared with the use of this casing, and to a process for producing the sausage casing.

BACKGROUND AND SUMMARY OF THE INVENTION

As compared with natural gut material, artificial sausage casings of two-dimensional fiber material accelerate the water loss associated with the maturing of the sausage. This phenomenom is frequently desired because it improves the economic efficiency of sausage production. However, predominantly in the range of higher qualities, there are types of sausage which demand slower maturing or in which a higher final moisture content is desired. For these types of sausage, natural gut has therefore hitherto been preferred. Moreover, it has hitherto not been possible with artificial sausage casings to adjust their influence on the rate of maturing in accordance with the type of sausage or the wishes of the producer.

An artificial sausage casing of the type mentioned at the outset has been disclosed (East German Patent Specification 71,469), which consists of close-mesh nettle fabric with an outer collagen coating, the fabric on the inside having its natural roughness due to the fibers projecting from the yarn. Before filling, the known sausage casing is soaked in water, which dries out during the maturing process, and is replaced by the fat and meat juice which originate from the sausage meat and which act like a protective layer around the sausage filling and enable the exchange of moisture and gases, necessary for the maturing process, to take place. The natural roughness of the fabric on the inside here has an advantageous effect on the adhesion to the sausage meat unless the latter has an excessively high fat content. In fact, the protein-containing meat juice absorbed by the fabric effects, after a certain degree of drying, an adequate bond to the surface enlarged by the fibers. A positive bond between the fibers projecting from the fabric yarn and the sausage meat does not result, because, with unchanged roughness of the textile material, the projecting fibers are too small and too soft for this purpose so that they are pressed more or less smoothly against the textile material by the sausage meat subject to the filling pressure. For this reason, adhesion between the sausage casing and the sausage meat is not established when the liquid absorbed by the casing from the meat contains a large quantity of fat which impairs the bonding effect. There is then a risk of the casing being detached from the sausage contents during the maturing and drying process, and thereby the goods can become unsaleable. A further disadvantage of the known sausage casing is that its moisture permeability is too high for some types of sausage. As mentioned above, some high-quality types of sausage demand a slow maturing process, because the release of moisture is reduced to a fraction. The known sausage casing is unsuitable for such applications.

Artificial sausage casings are also known which are impregnated with fat, oil or similar substances as a separating agent, in order to facilitate peeling of the sausage casing from the sausage contents.

However, it is not the aim of the invention to facilitate the separation of the sausage casing from the sausage contents, but its object is the provision of an artificial sausage casing, in which the influence on the rate of maturing of the sausage is adjustable in a controlled manner and which, in particular, also permits very slow maturing due to a low release of moisture.

According to the invention, this is achieved when the sausage casing has an impregnation with fat or wax and the roughness on the inside is formed by stiff fibers or filaments which, in the finished sausage, are positively anchored in the surface of the sausage meat. An embodiment with a fiber pile on the inside is particularly advantageous.

On the one hand, the invention is based on the concept of closing the flow and diffusion paths, which are otherwise available for the exchange of moisture, by the incorporation of fat in the sausage casing. By suitable choice of the degree of impregnation, the extent to which the exchange of moisture is reduced can then be determined. A controlled influence can thus be exerted on the rate of maturing of the sausage.

On the other hand, it has been found that the impregnation with fat alone does not give a useful result because it reduces the adhesion of the sausage casing to the sausage material so that the casing can be detached at some points as a result of the reduction in diameter, associated with maturing, of the sausage material. This is prevented by the fibers or filaments on the inside of the sausage casing being positively bonded to the sausage filling and thus compensating for the loss of adhesion caused by the impregnation with fat.

The experience gained with the above-described known sausage casing (East German Patent Specification 71,469) did not lead to the expectation that this means for obtaining the necessary bonding between the sausage casing and the sausage filling would be sufficient. In fact, it had been found that the roughness of the fabric, produced by the projecting fibers, favors the adhesion of the sausage casing to the sausage filling only if gluing of the protein due to the drying meat juice can take place at the casing, but that the roughness is useless if excess fat is present. This is confirmed by the known fact that detachment of the casing from the sausage filling is facilitated by impregnation of the sausage casings with fat (European Published Application 88,308; German Offenlegungsschrift 2,827,862). The fact that, in the known sausage casings, the fabric roughness does not improve the adhesion to the sausage filling when excess fat is present can be explained (with hindsight) in such a way that the fibers are pressed by the sausage filling against the fabric layer, so that they form a continuous surface which, although it has a larger specific area than a fabric freed from the free fibers and hence allows better protein gluing, makes it rather more difficult to obtain a positive bond with the sausage meat, because the depressions and openings which are present in the fabric and into which the sausage meat particles could penetrate and anchor themselves are covered by the superposed, pressed-on fiber layer.

The sausage casing according to the invention shows a fundamentally different behavior towards the sausage meat. Since the roughness on the inside of the sausage casing is not formed by soft fibers of nettle fabric, which, in the wet state, are pressed smoothly against the fabric surface by the filling meat, but is formed by fibers of sufficient inherent stiffness or by fiber bundles combined into filaments which, due to the bundling, have a greater stiffness and, due to the bonding into the fabric, have a main orientation directed transversely to the fabric surface, these fibers cannot readily be pressed against the fabric, or there is a higher probability for solid particles of the sausage filling to be incorporated between adjacent pieces of fiber or filament, which are at a mutual distance and project from the fabric, so that a positive bond is formed, the adhesion of which does not depend on surface adhesion, in contrast to the known sausage casings. The result is that the invention makes it possible to adjust the rate of maturing of the sausage by more or less extensive impregnation of the casing with fat, without the adhesion of the casing to the sausage filling necessarily being lost, even if large quantities of fat are absorbed.

The improvement in adhesion, effected by the pile, is the greater, the more pile fibers are available for anchorage in the filling meat and the higher the pile is. Therefore, the adhesion of the casing to the sausage material can readily be fixed by suitable choice of these parameters in accordance with the requirements, and particularly, if appropriate, as a function of the extent of the impregnation with fat. The pile is selected the higher and the denser, the more extensive the impregnation and, consequently, the more the adhesion is reduced. The properties of the fiber or filament material used can also play a role since some types of fibers have greater adhesion than others.

BRIEF DESCRIPTION OF THE DRAWINGS

The drawing is a schematic illustration of the sausage casing of the present invention with the pile being exaggerated.

DESCRIPTION OF A PREFERRED EMBODIMENT

Advantageously, the two-dimensional fiber material used is a woven pile fabric or knitted pile fabric, in which the fibers projecting inwards from the fabric surface form a looped pile.

According to the invention, at least the pile, but advantageously the entire two-dimensional fiber material, can be predominantly formed by an absorbent natural fiber. This improves the absorption during the impregnation with fat, while maintaining those properties of the natural fiber which promote maturing.

The fat content advantageously amounts to 0.5 to 3 times the weight of the unimpregnated two-dimensional fiber material. An impregnation rate of 80 to 400 g/m$^2$, in particular 200 to 300 g/m$^2$, has proved suitable.

As known per se, it is also advantageous in connection with the invention to provide the sausage casing with an impregnation of collagen or a similar material in order to obtain a dense skin structure in this way. According to the invention, this impregnation should be present predominantly on the outside of the sausage casing in order to provide a dry handle which otherwise could be unpleasantly impaired by the impregnation with fat.

To prevent the impregnation with fat from impeding the impregnation with collagen, the impregnation with fat is advantageously applied after the impregnation with collagen. Natural fats which are insensitive to oxidation are advantageously used for the impregnation. Instead, other fats with oxidation inhibitors, permitted under foodstuffs law, can also be used. Although only fat is mentioned in general in this description, this is meant to include oils and waxes. The fat used should be selected such that, on the one hand, it has an adequate dimensional stability or viscosity, so that, at the smoking temperature, it will remain in sufficient concentration at the envisaged location, but that, on the other hand, it is sufficiently flexible at the processing temperature which, during soaking and filling, can fall to 10° C. or even below this value.

The type of pile used is not subject to any restrictions. Even though a looped structure is often advantageous, a cut pile (plush) can also be used. Short loops are in general preferable to widely floating fibers, even though the latter should not be excluded in principle. It is not necessary for the material of the base fabric and the pile material to be the same. If, for example, the two-dimensional textile material used is a knitted fabric in plain jersey plush bonding, the base thread used can be a synthetic yarn monofilament, whilst a cotton is used for the pile thread. Correspondingly, if a knitted fabric in plain jersey backing bonding is used, a slightly twisted natural yarn can be used for the backing thread.

The invention has the advantage that the smoked product has a pleasantly light brown, not quite uniform coloring, as it is known from fat gut.

EXAMPLE

A circular-knitted cotton fabric in plain jersey plush bonding of cotton was produced with five needles per centimetre and eighteen wales per centimetre at a weight per meter of the knitted tube, when stretched to calibre 80, of 36 g. The knitted fabric extended to this calibre was coated on the outside with 10 g (dry) of collagen per meter and, after this coating had dried, impregnated on the inside with 60 g of fat per meter. The casing was easy to process on normal sausage-filling machines. After smoking, the surface assumed a yellowish-brownish coloration. Even after maturing of the sausage, the entire surface of the casing adhered to the surface of the sausage meat, but it could easily be peeled off for use. In the illustration, 1 marks the two-dimensionally stretched base material, from which the uncut plush filaments 2 project on the inside as a looped pile (shown exaggerated). On the outside, an impregnation layer of collagen is indicated at 3.

We claim:

1. A sausage containing sausage meat and having an artificial sausage casing of two-dimensional fiber material, said casing being rough on the inside and containing an impregnation or coating of collagen and a separate impregnation of fat, oil or wax, and wherein the roughness on the inside of said casing is formed by still fibers or filaments which are positively anchored in the surface of the sausage meat.

2. A sausage as claimed in claim 1, comprising a fiber pile on the inside of said casing.

3. A sausage as claimed in claim 2, wherein the two-dimensional fiber material is a woven or knitted pile fabric.

4. A sausage as claimed in claim 3, wherein said pile fabric has a looped pile.

5. A sausage as claimed in claim 2, wherein the pile is predominantly formed by an absorbent natural fiber.

6. A sausage as claimed in claim 1, wherein the fat or wax content is 0.5 to 3 times the weight of the unimpregnated two-dimensional fiber material.

7. A sausage as claimed in claim 1, wherein said casing has a fat content of 0.5 to 3 times the weight of the unimpregnated two-dimensional fiber material.

8. A sausage as claimed in claim 1, wherein the collagen impregnation or coating is provided predominantly on the outside of the casing.

* * * * *